United States Patent [19]

White

[11] 4,125,691
[45] Nov. 14, 1978

[54] ZERO PRESSURE DEVICE SUCH AS TIRES OR RUN-FLAT RINGS

[75] Inventor: John R. White, Wadsworth, Ohio

[73] Assignee: The Goodyear Tire & Rubber Company, Akron, Ohio

[21] Appl. No.: 783,902

[22] Filed: Apr. 1, 1977

[51] Int. Cl.$^2$ .................. C08G 18/10; C08G 18/14; C08G 18/48; C08J 9/34
[52] U.S. Cl. ................................ 521/51; 152/152; 152/158; 152/310; 152/330 RF; 152/167; 521/159; 521/176
[58] Field of Search ............... 260/2.5 AM, 2.5 AZ; 152/310, 152, 158, 330 RF

[56] References Cited

U.S. PATENT DOCUMENTS

| | | | |
|---|---|---|---|
| 3,392,772 | 7/1968 | Powers | 152/158 |
| 3,485,283 | 12/1969 | Brehmer | 152/158 |
| 3,605,848 | 9/1971 | Lombardi | 260/2.5 AM |
| 3,892,691 | 7/1975 | White | 260/2.5 AM |
| 3,949,796 | 4/1976 | Bartos | 152/158 |
| 3,968,061 | 7/1976 | Cardy | 260/2.5 AN |
| 4,020,001 | 4/1977 | White | 260/2.5 AM |

Primary Examiner—C. Warren Ivy
Attorney, Agent, or Firm—J. D. Wolfe

[57] ABSTRACT

A zero pressure device is composed of either a microcellular or homogeneous polyurethane made by reacting an organic polyisocyanate with at least three polyols, a monomeric polyol of 2 to 3 hydroxyls having a molecular weight less than 250, a polyether triol having a molecular weight of 4600 to 6000 and a polyether glycol having a molecular weight of 3500 to 4200. When the zero pressured device is a run-flat ring for a tire wheel assembly, it has an average density of 60 to 65 pounds per cubic foot and 30 to 42 pounds per cubic foot when it is a tire.

4 Claims, No Drawings

ZERO PRESSURE DEVICE SUCH AS TIRES OR RUN-FLAT RINGS

This invention relates to a liquid injectable moldable polyetherurethane composition suitable for producing a toroidal or circular shaped article useful in diverse applications ranging from low performance, low speed, low load applications, to relatively high performance, relatively high speed, high load applications. Particularly, this invention relates to said toroidal shaped articles useful for bicycle and related tires. More specifically, this invention in its more limited aspect, relates to a run-flat device of the pneumatic tire type.

Notwithstanding the fact that liquid injectable moldable polyurethane compositions are relatively old and have been used in many diverse applications, they have had a number of shortcomings which limited their usefulness as tires or run-flat devices. Namely, some polyurethane compositions had deficiencies in properties such as low resilience, poor hysteresis, to name a few such deficiencies.

This invention provides a polyurethane composition having superior properties for use as tires such as bicycle tires and/or run-flat devices. These devices are collectively called zero pressure inflatable means.

These zero pressure inflatable means can be made by charging a liquid polyetherurethane reaction mixture of the specific type described hereinafter into a suitable mold, preferably near the bottom thereof, and allowing the mixture to react and cure to give a zero pressure inflatable means when removed from the mold.

The specific polyetherurethane reaction mixtures useful in making the zero pressure inflatable means in one embodiment are formed by reacting 4,4'-diphenylmethane diisocyanate, sometimes referred to as MDI, with at least three polyols, the reaction occurring by reacting a 4600 to 6000 molecular weight polypropylene ether triol per se or one capped with 5 to 25 percent of ethylene oxide with sufficient MDI to form a quasiprepolymer having at least 10 percent free NCO and then reacting the quasiprepolymer with a mol of a polypropylene ether diol of 3500 to 4200 molecular weight and 85 to 99 mol percent of a monomeric polyol having 2 to 3 hydroxyls of less than 250 molecular weight based on excess of free NCO in the quasiprepolymer to form a polyetherurethane that exhibits improved hysteresis, less rolling resistance and good strength.

The nature of these specific polyurethanes and the various ways of making and utilizing them to make zero inflatable means are further illustrated in the following representative examples where all parts and percentages are by weight unless otherwise indicated.

EXAMPLE I

A bicycle tire was molded by filling a bicycle mold held in vertical position from substantially the bottom of the bead area of the tire with a polyetherurethane reaction mixture. The reaction mixture was made by injecting the resin blend and the quasiprepolymer into a high pressure injection mixer and then moving the mixture to the mold cavity. The resin blend tank of the machine was charged with a mixture of 87.33 parts of a polypropylene ether diol of 4000 molecular weight, 6.62 parts of ethylene glycol, 4.05 parts of diethanol carbamate together with 0.019 part of an organotin catalyst, 0.15 part triethylene diamine, 8.0 parts of trichloromonofluoromethane, 2.0 parts of carbon black and the isocyanate side was charged with 76.34 parts of a quasiprepolymer having free NCO content of 16 to 20 percent and composed of the reaction product of 7 mols of flaked 4,4'-diphenylmethane diisocyanate, normally called flaked MDI and one mol of a polypropylene ether triol of 4800 molecular weight.

The tire produced from this recipe was a solid one having a microporous center and a skin about one-eighth inch and when mounted on a bicycle wheel had a rolling resistance of about 1.2 and was essentially equivalent to that of a standard 65 pounds per square inch inflated commercial rubber pneumatic bicycle tire in riding characteristics and equal in mileage performance to a commercial pneumatic bicycle tire on standard bicycle tire stand test, or one made according to the teachings of United States patent application Ser. No. 751,936, filed December 17, 1976.

EXAMPLE II

A high performance zero pressure tire device of the run-flat class, i.e. one for use in a pneumatic tire-wheel assembly was made by using the following recipe:

| Ingredients | Parts |
|---|---|
| Polypropylene ether diol, 4000 molecular weight | 87.3 |
| Ethylene glycol | 6.62 |
| Diethanol carbamate | 4.07 |
| Dibutyltin dilaurate | 0.015 |
| Triethylene diamine | 0.04 |
| Organotin catalyst | 0.05 |
| Carbon black | 1.5 |
| Quasiprepolymer | 119.2 |
| Trichlorofluoromethane | 6.0 |
| Silicone surfactant* | 0.5 |
| Acrylonitrile grafted polypropylene ether glycol | 2.0 |

*Of block copolymer type available under trade names L5303 or Y6691.

The quasiprepolymer is the reaction product of 7 mols of flake MDI and one mol of a polypropyleneether triol of 4800 molecular weight.

These ingredients were mixed in a polyurethane mixer and charged by injection into a mold cavity to mold a run-flat ring or device having a 19.25 inch outside diameter (OD) by 13⅜ inch inside diameter (ID) ribbed ring which could be mounted on a standard size 14-inch wheel having a split rim. With this molded polyurethane run-flat ring attached to the wheel and loaded to about 300 pounds per axle. The device ran about the same miles as a device made from a polyester. It is unexpected to find an all-polyetherurethane to perform as well as a polyesterurethane under these test conditions.

The above recipe was modified by replacing ethylene glycol and diethanol carbamate with 20 parts 1,4-butanediol and reducing the quasiprepolymer from 119.2 parts to 117.5 parts. This recipe produced a run-flat device that ran more miles than one produced above. The run-flat devices produced by these recipes had a flexural fatigue and hysteresis properties approximately equivalent to an all-polyesterurethane one-shot device.

It should be noted that the run-flat ring can be attached to the wheel by the usual means such as wedging or bolting and then a pneumatic tire is mounted on the wheel over the run-flat ring or device. Each tire contains about a pint of a soap lubricant at the time it is mounted on the wheel to lubricate the run-flat ring as the tire is tested or operated in the deflated condition.

Where the zero pressure device is a run-flat ring for attachment to a wheel, it preferably should have a density of 60 to 65 pounds per cubic foot. On the other hand, the tire should have a density of 20 to 42 pounds per cubic foot to give the desired inflation-like feel to the tire ride and to give it good roll resistance. Actually, the zero pressure devices can be used over the range of densities from about 25 pounds per square inch up to a homogeneous or nonfoamed condition.

Representative members of the monomeric polyols useful in recipes set forth above to make the devices of this invention are 1,4-butanediol, ethylene glycol, diethanol carbamate, sometimes called 2-hydroxyl ethyl-2-hydroxyl ethyl carbamate, and preferably as blends of 10 to 50 percent by weight of ethylene glycol and diethanol carbamate, propylene glycol and trimethylol propane.

The representative polyether polyols useful in recipes set forth above to make the devices of this invention are those produced by propylene oxide condensation on a nucleus material such as glycols or triols and polytetramethylene glycol and optionally ethylene oxide capped ones. When the polyether polyol is a triol the molecular weight should be 4600 to 6000 but where the polyether polyol is a diol the molecular weight should be 3500 to 4200. It should be understood that the polyether triol is used to produce the quasiprepolymer.

The polyetherurethanes useful in this invention are the reaction product of 8.4 to 22.7 mols of organic polyisocyanate, preferably solid MDI or liquid MDI, 1.2 to 3.2 mols of a polyether triol of 4600 to 6000 molecular weight, 1 mol of a 3500 to 4200 molecular weight polyether diol, preferably polypropylene ether glycol per se or one ethylene oxide capped, 5.2 to 17.8 mols of a curative of the monomeric polyol type.

The recipe preferred for tires comprises 1.0 mol of a polyether diol of 5.2 to 9.4 mols of monomeric polyol and 1.2 to 1.9 mols of polyether triol and 8.4 to 13.6 mols of organic polyisocyanate.

The recipe preferred for run-flat devices comprises one mol of a polyether polydiol, 9.4 to 17.8 mols of monomeric polyol, 1.54 to 3.2 mols of polyether triol and 11.9 to 17.8 mols of organic polyisocyanate.

Sufficient water alone or in combination with auxiliary blowing agent such as fluorochlorohydrocarbons and related solvents boiling less than 250° F. are used in these recipes to give the desired density.

While certain representative embodiments and details have been shown for the purpose of illustrating the invention, it will be apparent to those skilled in this art that various changes and modifications may be made therein without departing from the spirit or scope of the invention.

What is claimed is:

1. A zero pressure device composed of a microcellular polyurethane foam having an average density of 60 to 65 pounds per cubic foot for a run-flat device and 30 to 42 pounds per cubic foot for a tire and a center portion having a density less than the density of the outer skin of said device, said microcellular polyurethane being a reaction product of an organic polyisocyanate with at least three polyols, each of said three polyols being characterized as follows: a polyol of 2 to 3 hydroxyls having a molecular weight of less than 250, a polyether triol having a molecular weight of 4600 to 6000 and a polyether diol having a molecular weight of 3500 to 4200, said organic polyisocyanate being selected from the class consisting of solid and liquid methylene-di(phenylene isocyanate) and a methylene-di(phenylene isocyanate) containing sufficient carbodiimide groups to give an isocyanate functionality of 2.1 to 2.3, said organic polyisocyanate being reacted with the polyether triol to form a quasi prepolymer, said quasi prepolymer then being reacted with the other polyols.

2. The zero pressure device of claim 1 wherein the device is a microcellular tire having a skin with more density than the center portion thereof.

3. The device of claim 1 wherein about 8.4 to 22.7 mols of an organic polyisocyanate is reacted with 1.2 to 3.2 mols of a polyether triol, one mol of a polyether diol and 5.2 to 17.8 mols of a polyol.

4. The device of claim 3 wherein the organic polyisocyanate is a solid or liquid MDI.

* * * * *